Patented Aug. 4, 1931

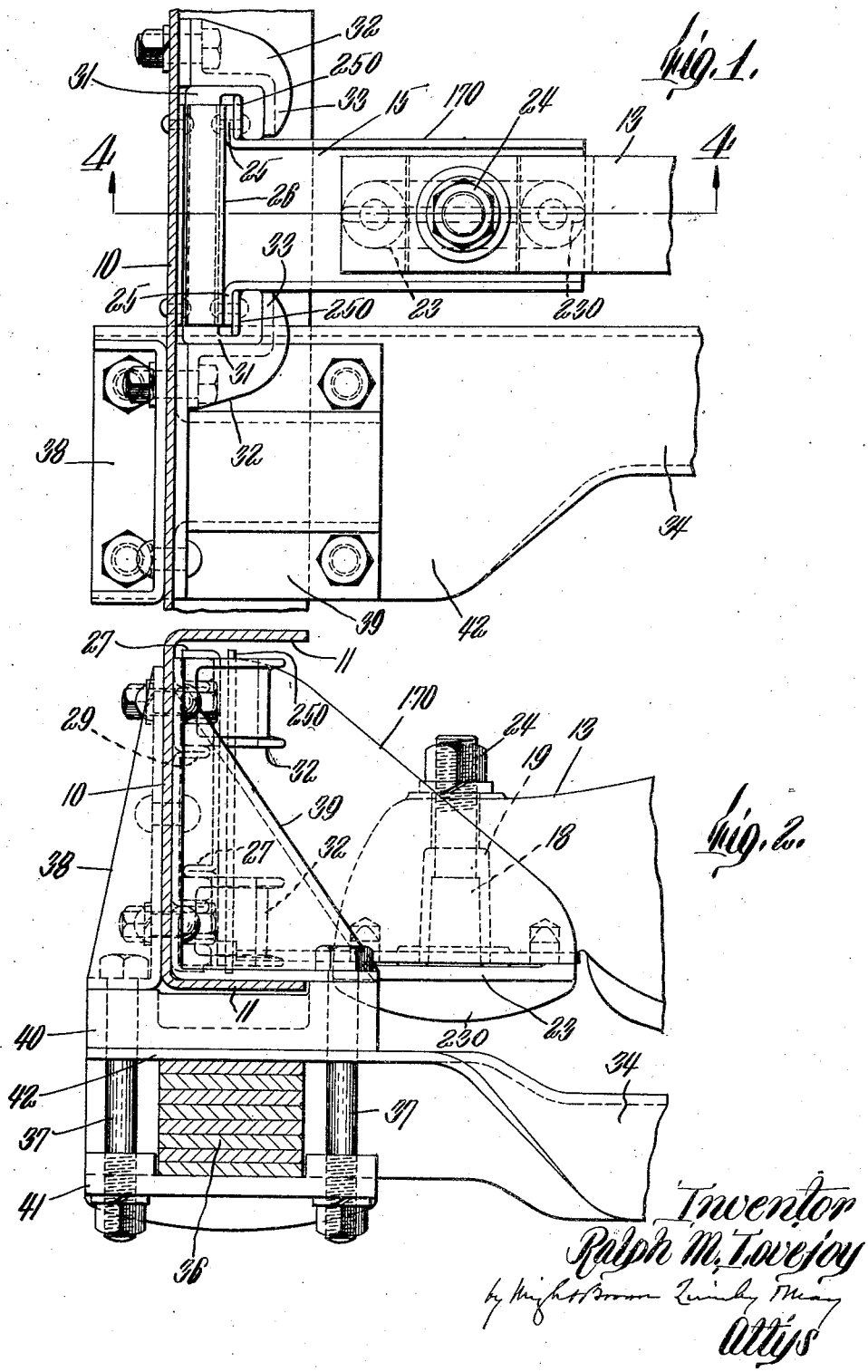

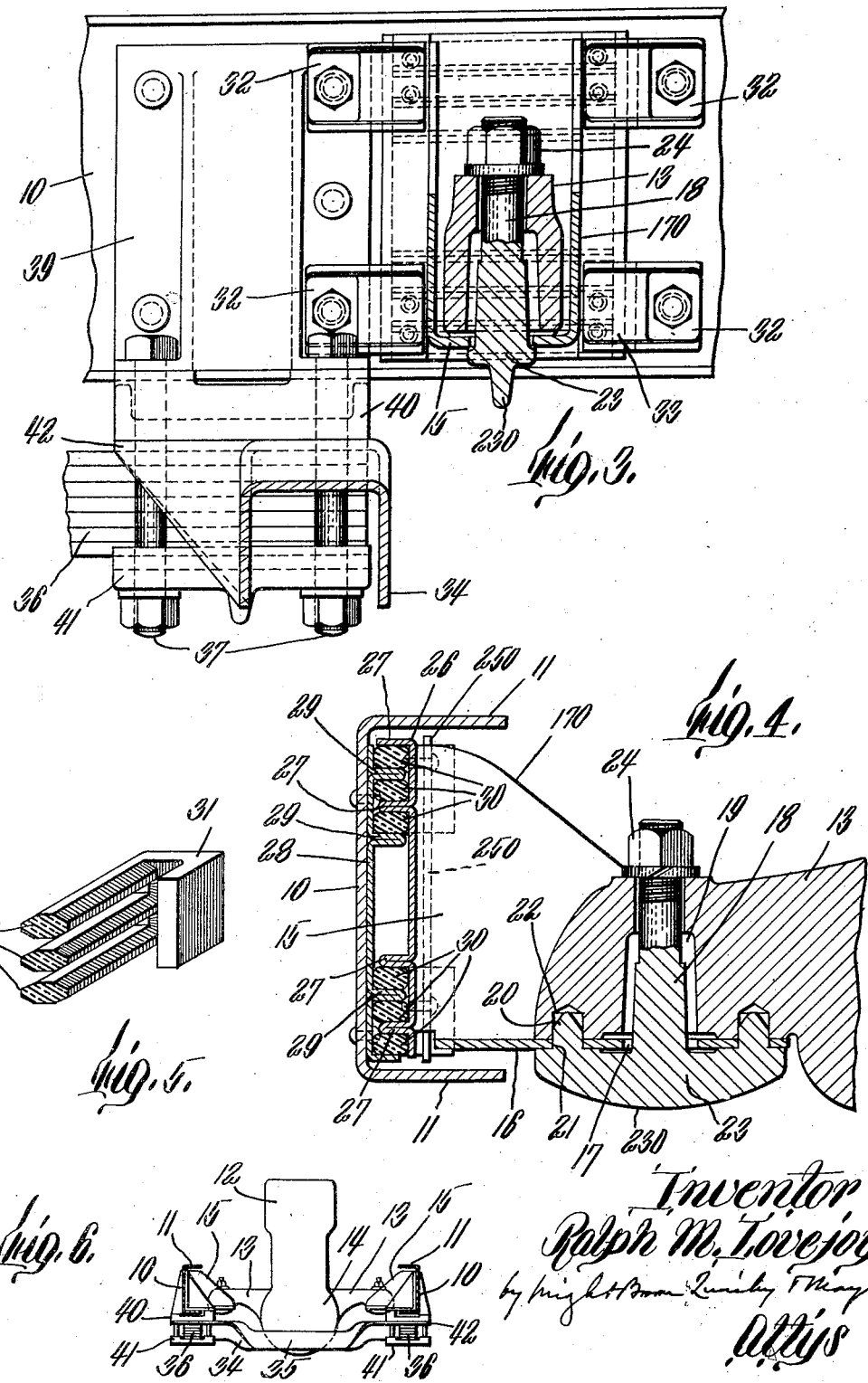

1,817,633

UNITED STATES PATENT OFFICE

RALPH M. LOVEJOY, OF BOSTON, MASSACHUSETTS

VEHICLE FRAME CONSTRUCTION

Application filed January 27, 1928, Serial No. 249,886. Renewed January 31, 1931.

This invention relates to automobile chassis construction, a purpose of the invention being to minimize or obviate twisting and lateral springing of the side frame members by concentrating at one locality on each side frame the strain-producing elements and applying in the same locality suitable means for opposing the springing and twisting tendencies. Stresses tending to twist and to spring the side frame members are liable to arise from two sources. First, from vibratory motions of the motor, the rear end of which is customarily connected to the frame for support, and second, from the forward vehicle springs, the rear ends of which are usually secured to the side frame members at some distance from the forward ends of the side frames. According to the invention, the rear end of the front vehicle springs and the rear end of the motor are secured to each side frame at the same locality, at which also the structure for opposing straining of the side frame member is provided.

In automobile construction, several things must be kept in mind, including the following. The parts should be so designed as to be readily put in place when the vehicle is being assembled; the parts to be assembled should be as few and simple as possible; and the effect of each part and combination of parts on the behavior of the vehicle when operated should be considered. In working toward a solution of the specific problem of devising a satisfastory support between the rear end of an automobile motor and the side frame members, it has been found advisable to have a slightly resilient joint at some point between the motor casing and the frame so as to prevent transmission of vibration from the motor to the frame and to cushion to some extent the vibrations and shocks set up in the frame when the vehicle is being operated. Such a joint may consist of a packing of rubber under pressure between rigid members secured respectively to the motor casing and the frame members. This joint, being slightly resilient, necessarily permits a slight hinge motion, and if as usual the joint be at a point spaced from the side frame member to facilitate the making of the joint when the motor is lowered into the frame in the course of assembling the vehicle, the joint is thus provided with a leverage to exert a vibratory twisting force on the side frame members when the motor vibrates up and down as it is liable to do at certain speeds. A lateral vibration is also set up in the side frame members, as the up and down vibrations of the motor tend alternately to pull the side frames together and to push them apart. The effects of such vibrations are unpleasant to the operator and injurious to the vehicle. It is an object of this invention to obviate these vibrations by making the leverage arm between the side frame members and the resilient joint of negligible length, and at the same time to facilitate the operation of mounting a motor on the frame and securing it thereto. To this end, the resilient joint is made as close as possible to the upright wall of the side frame, the joint being made between a plate secured to the side frame itself and a member projecting toward the motor to receive the end of the arm of the motor casing and to be rigidly secured thereto so that the arm and member become the equivalent of an unjointed arm extending from the motor casing to a point closely adjacent to the upright wall of the side frame. In addition to the structure thus far mentioned, a stiffening member may be extended transversely of the vehicle, the ends of the member being rigidly secured to the side frame members at points closely adjacent to the points of connection of the motor-supporting means. In this same locality also the rear end of the front vehicle springs may, according to the invention, be secured so that the elements of structure tending to strain the frame member and the elements tending to oppose or eliminate strain are thus concentrated at closely adjacent points.

Various other advantageous features of structure are hereinafter described and disclosed on the drawings, of which,—

Figure 1 is a fragmentary plan view of a portion of a side frame member of an automobile having connected therewith members embodying the invention.

Figure 2 is an elevation of the parts shown in Figure 1, the side frame member being shown in transverse section.

Figure 3 is a side elevation of the parts shown in Figure 1, some of the parts being shown in section.

Figure 4 is a section on the line 4—4 of Figure 1.

Figure 5 is a fragmentary perspective view of a cushioning member.

Figure 6 is a conventional cross section of an automobile frame showing a motor supported therein according to the invention.

Referring to the drawings in detail, 10 represents a side frame member of an automobile chassis, this member preferably comprising the usual channeled beam having the flanges 11 of the channel extending horizontally inward. In assembling an automobile, the motor 12 (Figure 6) is customarily lowered into a space provided therefor between the side frame members 10 and is hung therefrom by arms 13 which extend laterally from the lower portion 14 of the motor casing. The arms 13 are connected to the frame members 10 by an intermediate arm or bracket extending inwardly from the latter. According to the invention, channel brackets 15 are connected to the frame members 10 as will hereinafter be described and are adapted to receive the ends of the arms 13 to which they are rigidly secured. This construction aids in the process of installing the motor in the frame since the channeled brackets 15 readily receive the arms 13 and support the motor independently of bolts or other securing means which may be subsequently employed to secure the motor in place. In order to facilitate the assembling of the parts with a minimum of operations, the bottom portion 16 of the channeled bracket 15 may be perforated as at 17 to receive a bolt 18 which is adapted to pass therethrough and also through a perforation 19 in the arm 13 by which the arm 13 may be securely bolted to the bracket 15. In order to provide a bolt which is self-centering so that no time need be lost in adjusting the position of the motor accurately so as to make the perforations 17 and 19 register exactly, these perforations may be made oversize so as to receive the bolt even if not in the exact registry, the centering being brought about by any convenient means such as one or more pins 20 having tapered ends adapted to enter suitable perforations 21 in the bottom member 16 of the channeled bracket and corresponding recesses 22 in the arm 13. The bolt 18 may be provided with an enlarged or elongated head portion 23, preferably stiffened as by a rib 230, upon which the pins or lugs 20 may be formed. The lower portions of the pins 20 are preferably of a size to fit snugly in the perforations 21 and the recesses 22 so that when the head 23 of the bolt is drawn up against the bottom of the bracket 15, the arm 13 is drawn into accurate position with respect to the bracket 15 and is rigidly locked there. The bolt 18 may be held in place by a suitable nut 24 which is secured in position by a lock washer, cotter pin, or any other convenient means. It is evident from Figure 4 that this construction provides a rigid joint between the arm 13 and the bracket 15 which permits no pivotal or hinge action whatever when the bolt is drawn up tightly. In order to ensure easy riding of the vehicle and to minimize the transmission of vibrations from the motor to the vehicle frame or from the frame to the motor, it is found necessary to insert a cushioning element at some point between the motor and the frame. Such a cushioning element is by its very nature yielding to a certain degree so that it results in a slight hinging or pivotal effect wherever it is located. Thus if it is located at a distance from the frame 10, the arm from the frame to the cushion pivot point is thus a lever which tends to impress an oscillating torque on the frame when the motor oscillates up and down. At certain speeds, this effect is often quite pronounced and results in a slight twisting action on the side members 10 which also move them toward and away from each other and sets up an undesirable vibration of the vehicle as a whole which is not only uncomfortable to the operator but is also injurious to the vehicle itself. It is therefore desirable that the cushioning element be located as close to the side frame 10 as possible in order to minimize the lever arm by which the motor vibrations may result intortional vibrations of the side frame. By this invention, the cushioning element is located close to the upright portion of the side frame 10 without, however, necessitating a structure which will hinder or make difficult the assembling of the motor with the vehicle frame. To this end, the bracket 15 is preferably formed of a piece of sheet metal which is shaped in the form of a channel having a bottom portion 16 and upwardly extending side walls 17. These side walls at their outer ends may be bent away from each other as at 25 forming ears to which may be riveted or otherwise secured an end plate 26. The ears 25 may be reinforced, if desired, by vertical strips 250 which as shown are riveted together with the ears and with the plate 26. In order to provide a suitable cushioning member adapted to support the weight of the motor, the plate 26 is preferably provided with a plurality of outwardly extending ledges 27, four such ledges being illustrated in Figure 4. These ledges are suitably spaced apart and any desired number of them may be provided. Cooperating with the ledges 27 is a plate 28 having inwardly extending ledges 29. There are preferably the same number of ledges 29 as there are ledges 27, the former being uniformly spaced below the latter when the parts are assembled as shown in Figure 4. The arrangement of ledges may be as desired. In the embodiment illustrated, the ledges are arranged in two sets, one pair of ledges 27 and corresponding ledges 29 being located adjacent the top of the bracket 15, another pair of ledges 27 and corresponding ledges 29 being located adjacent to the bottom of the bracket 15. Each pair of ledges 27 alternates with the corresponding ledges 29 forming spaces or chambers with adjacent vertical portions of the plates 26 and 28 in which cushioning elements of resilient material are carried. As a result of the arrangement illustrated in Figure 4, the weight of the motor is carried by four of the cushioning elements on which the ledges 27 rest and which in turn are supported by ledges 29. Cushioning material, such as rubber, is limited as to the weight it can carry per unit of bearing area so that by providing a plurality of elongated ledges 27 to bear on the cushioning elements, relatively narrow elements may be used without reducing the total bearing area too far. This permits a relatively close approach of the plate 26 to the side frame 10 and a consequent shortening of the lever arm between the frame and the virtual pivot point of the resilient joint. In order to facilitate the mounting of the brackets 15 against the frames 10, the cushion elements may conveniently comprise a plurality of elongated members 30 of rubber or other suitable resilient material, these members being as long as the ledges 27 or 29 and being preferably united at both ends by hook-shaped portions 31 which are fashioned to fit around the ears 25 and the reinforcing strips 250. Thus in assembling the bracket 15 with the frame 10, the hook ends 31 of the cushion members may be quickly snapped around the ears 25 so that the elements 30 will be held in correct position with respect to the ledges 27. The bracket 15 being thereupon moved into place against the frame 10, the ledges 29 will be suitably spaced from the ledges 27 and will cooperate therewith in enclosing the several elements 30 therebetween as shown in Figure 4. The elements 30 are preferably formed with polylateral cross sections such as an octagon, as shown in Figure 5. The bracket 15 may be secured in place by any convenient means. As shown, a pair of hook members 32 may be bolted or otherwise secured to the frame 10, these members having portions 33 extending around behind the ears 25 and the hook ends 31 so that the ends 31 form a cushion pad between the clamp ends 33 and the ears 25. The clamps 32 are preferably drawn so as to force the plate 26 toward the plate 27 and thus to compress the cushion elements 30 therebetween. This results in a distortion of the material of the elements 30 under pressure which provides superior cushioning effects, the distortion in the embodiment illustrated in Figures 4 and 5 consisting in the squeezing of the octagon cross section into an approximate rectangle. The structure described results in a virtual rigid arm extending from the motor casing to within a short distance of the vertical portion of the frame 10, the distance being that between the plates 26 and 27 so that there is virtually no lever arm between the cushioning point and the frame 10 by which a tortional effect may be impressed on the frame from the up and down vibration of the motor 12. The structure of the joint between the bracket 15 and the arm 13 facilitates rapid and easy assembling of the motor with the frame, but at the same time is sufficiently rigid to give the joint bracket 15 and arm 13 the effect of a unitary rigid member. In order to provide further stiffening of the vehicle frame against impressed bending and twisting stresses, a transverse member may extend from one side frame 10 to the opposite frame member between the lower portions of the motor casing and the transmission casing. The transverse stiffening member may comprise an inverted channel 34, the central portion of the channel being downwardly offset as at 35 sufficiently to clear the connecting elements between the motor casing and the transmission casing. The member 34 may be arranged to stiffen the frame members 10 against the twisting and springing stresses arising not only from motor vibrations, but also from the forward vehicle springs 36, the latter stresses often being severe when the vehicle is operated over rough roads. To this end, each of the forward springs may be secured to the corresponding frame 10 at a point adjacent to the bracket 15. As shown on the drawings, the spring 36 may be clamped below the frame 10 by suitable bolts 37 hung from brackets 38, 39. The latter are preferably made of steel stampings and are provided with suitable stiffening ribs as desired. The brackets 38, 39 may be riveted or otherwise secured to opposite sides of the frame member 10 as shown. The bolts 37 may extend through a spacer block 40 which is disposed between the frame 10 and the top of the spring 37, and a plate 41 which engages the bottom of the spring. The channel member 34 as shown may have one of the flanges straightened out at the end thereof, the flattened portion 42 being clamped between the spacer block 40 and the top of the spring 37. The location of the channeled brace 34 and the structure of the motor supports thus cooperate to minimize stresses on the frame members 10 arising from motor vibrations and road shocks transmitted through the vehicle springs.

Having thus described certain embodiments of this invention, it should be evident to those skilled in the art that various changes and modifications might be made therein without departing from its spirit or scope as defined by the appended claims.

I claim:—

1. In a vehicle having a pair of side frame members, a motor, and frame-supporting springs, means for connecting the rear portion of the motor to the frame members to be supported thereby, means for securing an end of each of said springs to a side frame member at a point adjacent to said motor-supporting means, and a stiffening member extending transversely of the vehicle from one side frame to the other, each end of said stiffening member being rigidly secured between one of said frames and the spring secured thereto.

2. In a vehicle having a pair of side frame members, a motor, and frame-supporting springs, means for connecting the rear portion of the motor to the frame members to be supported thereby, said connecting means including a cushioning member closely adjacent to each frame member, a spring-engaging clamp secured to each said frame member adjacent to said connecting means and a stiffening channel member extending from one side frame to the other, each end of said stiffening member being clamped with a vehicle spring by one of said clamps.

3. In a vehicle having a side frame and a motor, a support for said motor comprising an arm projecting laterally from the motor casing, said arm having an end portion with a vertical bore therethrough and a pair of recesses in the under face thereof, a channeled bracket projecting from said side frame, said bracket having side walls, an end wall and a bottom wall with perforations therein to register with said bore and recesses, means for alining said bore with its corresponding perforation, said alining means comprising a bolt having a head portion with tapered pins projecting therefrom parallel to the bolt, said pins being arranged to enter said recesses when said bolt is inserted upwardly through said bore, and a resilient joint between the side frame and the end wall of the bracket.

4. In a vehicle having a side frame and a motor, a support for said motor comprising an arm projecting laterally from the motor casing, a bracket rigidly secured to said arm, said bracket having a face adjacent to a face of said side frame, a series of ledges projecting from the face of the bracket, an equal number of ledges projecting from said face of the side frame and alternating with the ledges from the bracket to form with the side frame and bracket a series of horizontal chambers, the uppermost of said ledges projecting from the bracket and the lowermost of said ledges projecting from the side frame strips of resilient material substantially filling said chambers, and means maintaining said strips laterally compressed between said side frame and bracket.

5. In a vehicle having a side frame and a motor, a support for said motor comprising an arm projecting laterally from the motor casing, said arm having a bore therethrough adjacent the end thereof and a recess therein adjacent to said bore, a support member secured to said side frame, said support member having perforations therethrough to register with said bore and recess respectively, and means for rigidly securing said arm and member together including a bolt passing through said bore and corresponding perforation, said bolt having a head portion with a pin projecting therefrom into said recess through the corresponding perforation, and a nut threaded on the other end of said bolt.

6. In a vehicle having a side frame and a motor, a support for said motor comprising an arm projecting laterally from the motor casing, a channel member projecting from said side frame and adapted to receive the end portion of said arm from above, a rigid joint between said arm and channel member, and a slightly resilient joint between said frame and said channel member.

7. In a vehicle having a side frame and a motor, a support for said motor comprising an arm extending laterally from the motor casing, a channel member secured to said frame and projecting therefrom to receive an end portion of said arm from above, a packing of resilient material under pressure between said frame and said channel member, and a rigid joint between said channel member and said arm.

8. In combination with a supporting wall and a bracket, a resilient joint between said wall and bracket comprising a wall plate secured to said wall having a plurality of horizontal ledges projecting therefrom, a bracket plate secured to an end of said bracket, said bracket plate having horizontal ledges projecting therefrom and having end portions extending laterally beyond the sides of the bracket, said wall ledges and bracket ledges being disposed in alternating spaced arrangement, and a cushion member having a strip of resilient material under lateral compression between said plates and each successive pair of ledges, the normal width of each strip being greater than the width of said ledges, said cushion member also having end portions connecting the ends of said strips and shaped in hook form to catch around the ends of said bracket plate and to hold the cushion member in place against the bracket plate when the bracket is disengaged from said wall, and means extending from said wall and engaging behind the ends of said bracket plate for securing the bracket to the wall and compressing the strips of the cushion member.

9. In combination, a bracket comprising a channel piece having a bottom wall and side walls, portions of said side walls being turned outwardly at one end of the bracket to form ears, an end plate rigidly secured to said ears, said end plate being formed with a plurality of horizontal ledges extending outwardly therefrom, a supporting wall, a plurality of horizontal ledges extending outwardly from said wall in spaced alternation with the ledges on said end plate, a cushion member of resilient material having a plurality of elongated strips, a strip being disposed between each pair of successive ledges, said cushion member also having hooked end portions connecting said strips at their ends and hooking around said ears, and means for securing said bracket to said wall comprising clamps extending from said wall and engaging said hooked ends behind said ears.

In testimony whereof I have affixed my signature.

RALPH M. LOVEJOY.